United States Patent
Ikeuchi (10) Patent No.: US 10,862,544 B2
(45) Date of Patent: Dec. 8, 2020

(54) MAGNETIC COUPLER AND COMMUNICATION SYSTEM

(71) Applicants: Kabushiki Kaisha Toshiba, Minato-ku, Tokyo (JP); Toshiba Electronic Devices & Storage Corporation, Minato-ku, Tokyo (JP)

(72) Inventor: Katsuyuki Ikeuchi, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/269,102

(22) Filed: Feb. 6, 2019

(65) Prior Publication Data

US 2020/0076478 A1  Mar. 5, 2020

(30) Foreign Application Priority Data

Sep. 5, 2018  (JP) .................................. 2018-165899

(51) Int. Cl.
| | |
|---|---|
| H01P 5/19 | (2006.01) |
| H01F 38/14 | (2006.01) |
| H04B 5/00 | (2006.01) |
| H04L 25/02 | (2006.01) |

(52) U.S. Cl.
CPC .......... H04B 5/0087 (2013.01); H01F 38/14 (2013.01); H04B 5/0031 (2013.01); H04L 25/0266 (2013.01); *H01F 2038/143* (2013.01)

(58) Field of Classification Search
CPC ... H01P 5/19; H03H 7/42; H01F 19/00; H01F 38/14; H03F 2200/09; H03F 2200/541; H03F 2203/45051

USPC .................................... 333/24 R, 25, 26, 119
See application file for complete search history.

(56) References Cited

U.S. PATENT DOCUMENTS 7,151,430 B2   12/2006  Mattsson
7,495,525 B2 *  2/2009  Ilkov .................... H01F 17/0013
                                            333/26
7,940,152 B1 *  5/2011  Kim ........................ H01F 19/04
                                            336/180

(Continued)

FOREIGN PATENT DOCUMENTS

| JP | 2005-347286 A | 12/2005 |
|---|---|---|
| JP | 2006-032805 A | 2/2006 |
| JP | 2007-526642 A | 9/2007 |

*Primary Examiner* — Dean O Takaoka
(74) *Attorney, Agent, or Firm* — White & Case LLP (57) ABSTRACT

According to one embodiment, in a magnetic coupler, a plurality of coils includes a first pattern and a second pattern. The first pattern includes a first winding portion and a second winding portion. The second winding portion is arranged in a first direction to the first winding portion. The second pattern is disposed adjacent to the first pattern along the first plane. The second pattern is arranged at a position corresponding to a boundary between the first winding pattern and the second winding pattern. The second pattern includes a third winding portion and a fourth winding portion. The fourth winding portion is arranged in a second direction to the third winding portion. The second direction is a different direction from the first direction. The fourth winding portion is wound in a reversed direction with the third winding portion.

20 Claims, 8 Drawing Sheets

(56) References Cited

U.S. PATENT DOCUMENTS

| | | | | |
|---|---|---|---|---|
| 8,779,855 | B2* | 7/2014 | Iida | H03F 1/56 |
| | | | | 330/255 |
| 8,791,769 | B2* | 7/2014 | Leong | H01P 5/10 |
| | | | | 333/25 |
| 9,208,943 | B2* | 12/2015 | Anderson | H03F 1/0227 |
| 2013/0265132 | A1* | 10/2013 | Huang | H01F 27/2804 |
| | | | | 336/192 |
| 2014/0041173 | A1* | 2/2014 | Yen | H01L 23/5223 |
| | | | | 29/25.01 |
| 2017/0012601 | A1* | 1/2017 | Yen | H03H 7/42 |
| 2018/0123550 | A1* | 5/2018 | Wang | H01F 21/12 |

* cited by examiner

MAGNETIC COUPLER AND COMMUNICATION SYSTEM

CROSS-REFERENCE TO RELATED APPLICATIONS

This application is based upon and claims the benefit of priority from Japanese Patent Application No. 2018-165899, filed on Sep. 5, 2018; the entire contents of which are incorporated herein by reference.

FIELD

Embodiments described herein relate generally to a magnetic coupler and a communication system.

BACKGROUND

A magnetic coupler including a plurality of pairs of coils is capable of transmitting a plurality of signals from a primary side to a secondary side with the plurality of pairs of coils. At this time, it is preferable to appropriately transmit the plurality of signals.

DETAILED DESCRIPTION

In general, according to one embodiment, there is provided a magnetic coupler including a plurality of coils. The plurality of coils comprises a first pattern and a second pattern. The first pattern is disposed along a first plane. The first pattern includes a first winding portion and a second winding portion. The second winding portion is arranged in a first direction to the first winding portion. The second winding portion is wound in a reversed direction with the first winding portion. A second pattern is disposed adjacent to the first pattern along the first plane. The second pattern is arranged at a position corresponding to a boundary between the first winding pattern and the second winding pattern. The second pattern includes a third winding portion and a fourth winding portion. The fourth winding portion is arranged in a second direction to the third winding portion. The second direction is a different direction from the first direction. The fourth winding portion is wound in a reversed direction with the third winding portion.

Exemplary embodiments of a magnetic coupler will be explained below in detail with reference to the accompanying drawings. The present invention is not limited to the following embodiments.

Embodiment

A magnetic coupler according to an embodiment will be described. For example, in a case where a primary side circuit and a secondary side circuit are greatly different in operating voltage, the magnetic coupler is used in a case where it is desired to transmit signals while electrically insulating the primary side circuit and the secondary side circuit from each other. For example, in a case where the primary side circuit includes a motor and an inverter circuit for driving the motor and the secondary side circuit includes a controller for controlling the inverter circuit, the magnetic coupler is disposed between the primary side circuit and the secondary side circuit, so that it is possible to prevent an inrush current from flowing into the controller when the motor is activated.

In a communication system including the magnetic coupler, a transmission circuit is provided in the primary side circuit, and a reception circuit is provided in the secondary side circuit. The magnetic coupler is disposed between the transmission circuit and the reception circuit.

A magnetic coupler including a plurality of pairs of coils is capable of transmitting a plurality of signals from a primary side to a secondary side with a plurality of pairs of coils. In each of the plurality of pairs, the magnetic coupler is configured such that the coil corresponding to the transmission circuit and the coil corresponding to the reception circuit are electrically insulated from each other and magnetically coupled with each other. In this case, in each of the plurality of pairs, it is desirable that the magnetic coupler appropriately transmits signals and/or electric power from the coil on the transmission side (primary side) to the coil on the reception side (secondary side) while isolating the transmission circuit and the reception circuit.

When large intervals between a plurality of coils on each of the transmission side and the reception side are secured in order to avoid interference of signal and/or electric power among the plurality of pairs, a mounting area of the magnetic coupler is likely to increase, and the cost of the magnetic coupler is likely to increase.

On the other hand, when the intervals between the plurality of coils on the transmission side and the reception side is narrowed in order to reduce the mounting area of the magnetic coupler, the interference of signal and/or electric power among the plurality of pairs becomes conspicuous, so that there is a possibility that it is difficult to appropriately transmit a plurality of signals.

Figure 8:
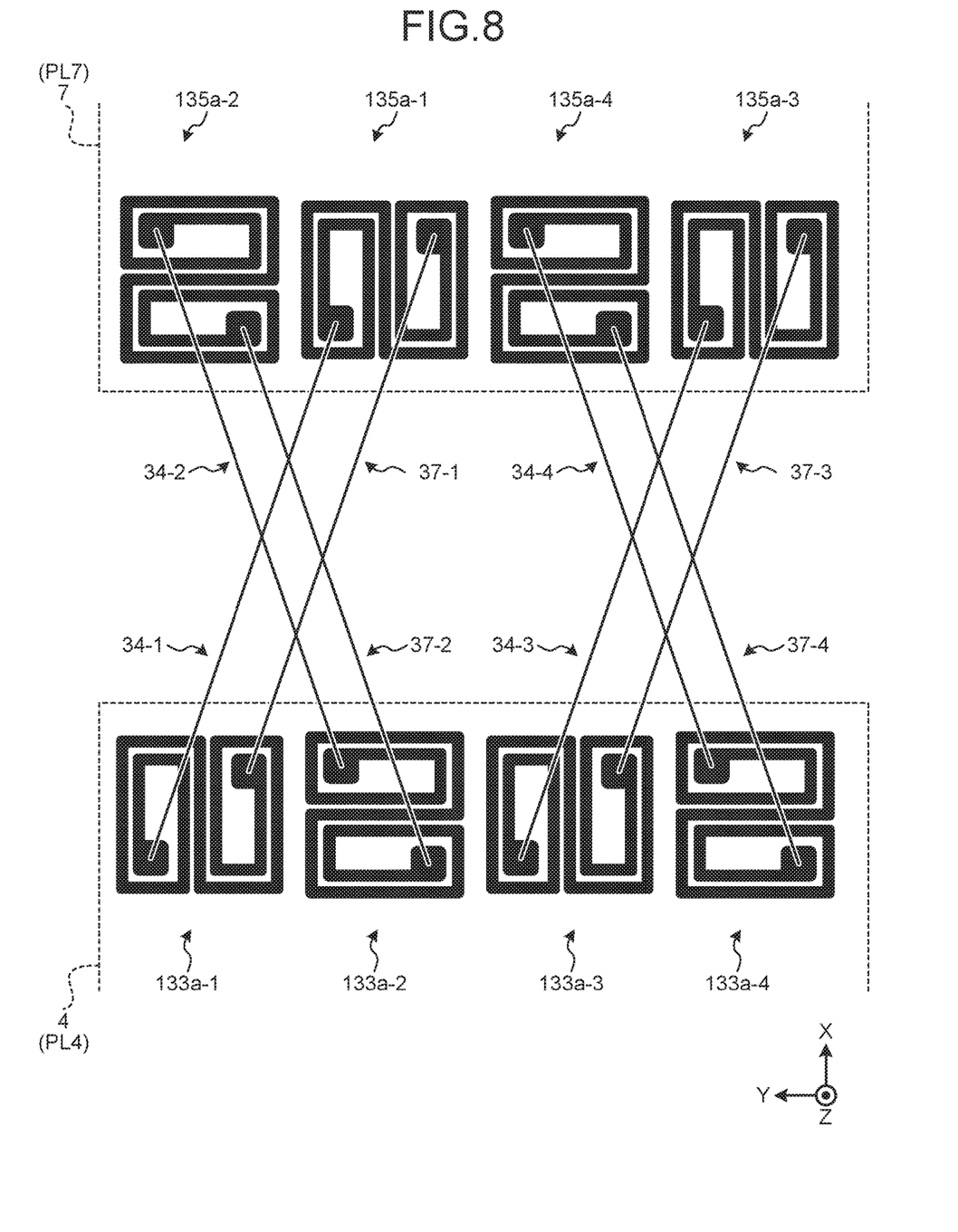
FIG. 8 is a diagram illustrating a mounting configuration of a bonding wire in the embodiment.

Therefore, in the present embodiment, in the magnetic coupler, each pattern (each pattern) of the plurality of coils is configured as a figure-8 shape, and adjacent patterns in the plane are disposed in the direction of mutual rotation, so that the reduction of the mounting area and the appropriate transmission of the plurality of signals are made compatible.

Figure 1:
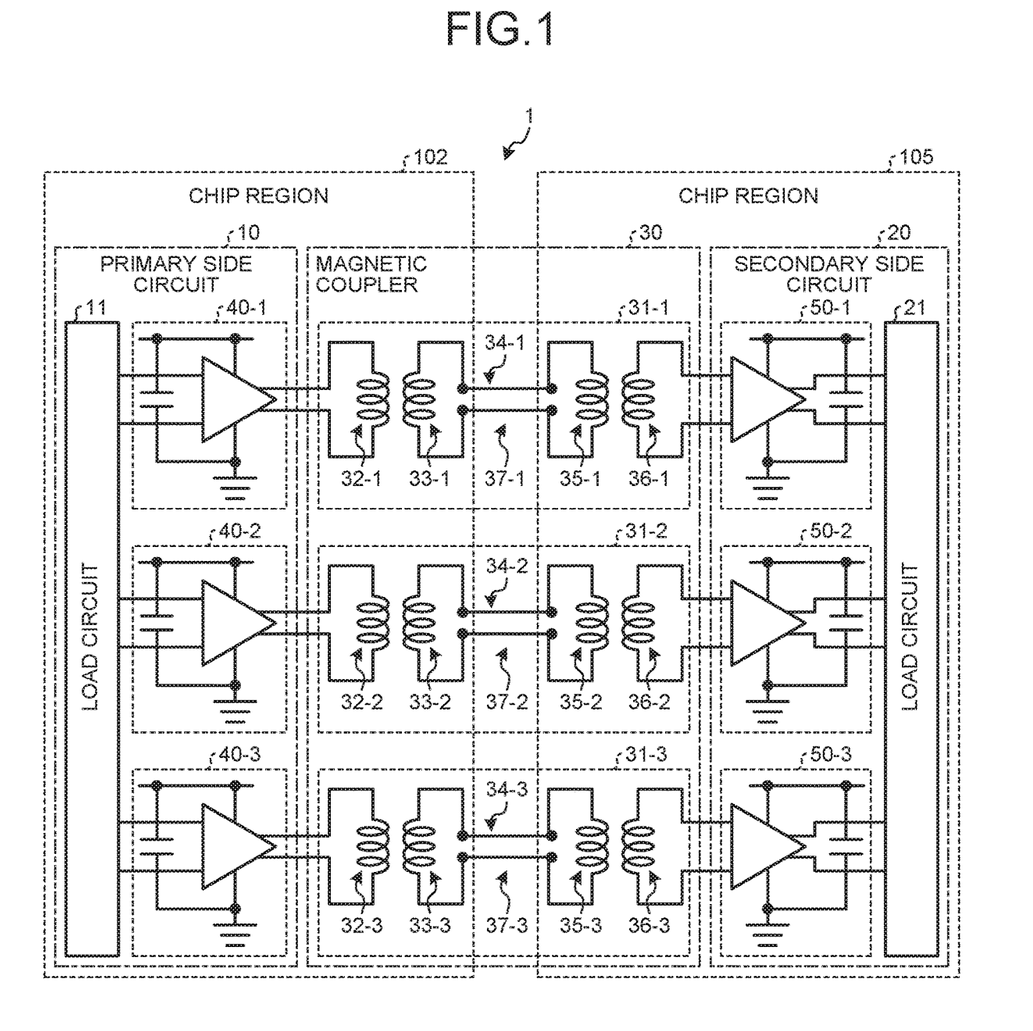
FIG. 1 is a diagram illustrating a circuit configuration of a communication system including a magnetic coupler according to an embodiment.

Specifically, a communication system 1 including a magnetic coupler 30 may be configured as illustrated in FIG. 1. FIG. 1 is a diagram illustrating a circuit configuration of the communication system 1 including the magnetic coupler 30.

The communication system 1 includes a primary side circuit 10, a secondary side circuit 20, and a magnetic coupler 30. The magnetic coupler 30 is disposed between the primary side circuit 10 and the secondary side circuit 20. The magnetic coupler 30 can magnetically couple the primary side circuit 10 and the secondary side circuit 20 to each other while electrically insulating the primary side circuit 10 and the secondary side circuit 20 from each other.

The magnetic coupler 30 may be a coupler corresponding to a differential configuration. The magnetic coupler 30 converts a plurality of pairs of differential signals transmitted from the primary side circuit 10 into magnetic field energy, re-converts the magnetic field energy into a plurality of pairs of differential signals, and transmits the plurality of pairs of differential signals to the secondary side circuit 20. In FIG. 1, a configuration in which the magnetic coupler 30 converts three pairs of differential signals into magnetic field energy and re-converts the magnetic field energy into three pairs of differential signals is illustrated.

The primary side circuit 10 includes a load circuit 11 and a plurality of transmission circuits 40-1 to 40-3. The secondary side circuit 20 includes a plurality of reception circuits 50-1 to 50-3 and a load circuit 21. For example, in a case where the operating voltages (for example, three phase voltages of U phase, V phase, and W phase) of the motor is monitored with the controller or in a case where the controller controls the operation of the motor (for example, controls three phase voltages of U phase, V phase, and W Phase in PWM control), the plurality of transmission circuits 40-1 to 40-3 corresponds to three phases of U phase, V phase and W phase, and the plurality of reception circuits 50-1 to 50-3 may correspond to three phases of U phase, V phase, and W phase.

The magnetic coupler 30 includes a plurality of unit couplers 31-1 to 31-3. The plurality of unit couplers 31-1 to 31-3 corresponds to the plurality of transmission circuits 40-1 to 40-3 and corresponds to the plurality of reception circuits 50-1 to 50-3.

The unit coupler 31-1 may be configured as a double insulation type. The unit coupler 31-1 includes a coil 32-1, a coil 33-1, bonding wires 34-1 and 37-1, a coil 35-1, and a coil 36-1. The coil 32-1 is electrically connected to the transmission circuit 40-1. The coil 33-1 is disposed above the coil 32-1 and faces the coil 32-1 through an insulating film (refer to FIG. 2). As a result, the coil 32-1 and the coil 33-1 may be electrically insulated from each other and magnetically coupled with each other. The bonding wires 34-1 and 37-1 electrically connect the coil 33-1 and the coil 35-1, respectively. The coil 36-1 is disposed below the coil 35-1 and faces the coil 35-1 through an insulating film (refer to FIG. 2). As a result, the coil 35-1 and the coil 36-1 may be electrically insulated from each other and magnetically coupled with each other. The coil 36-1 is electrically connected to the reception circuit 50-1.

In addition, the other unit couplers 31-2 and 31-3 may also be configured similarly to the unit coupler 31-1. In addition, the coils 32 and 33 in the primary side circuit 10 and each of the unit couplers 31 may be included in a chip region 102, and the coil 35 and the coil 36 in the secondary side circuit 20 and each of the unit couplers 31 may be included in a chip region 105.

Figure 2:
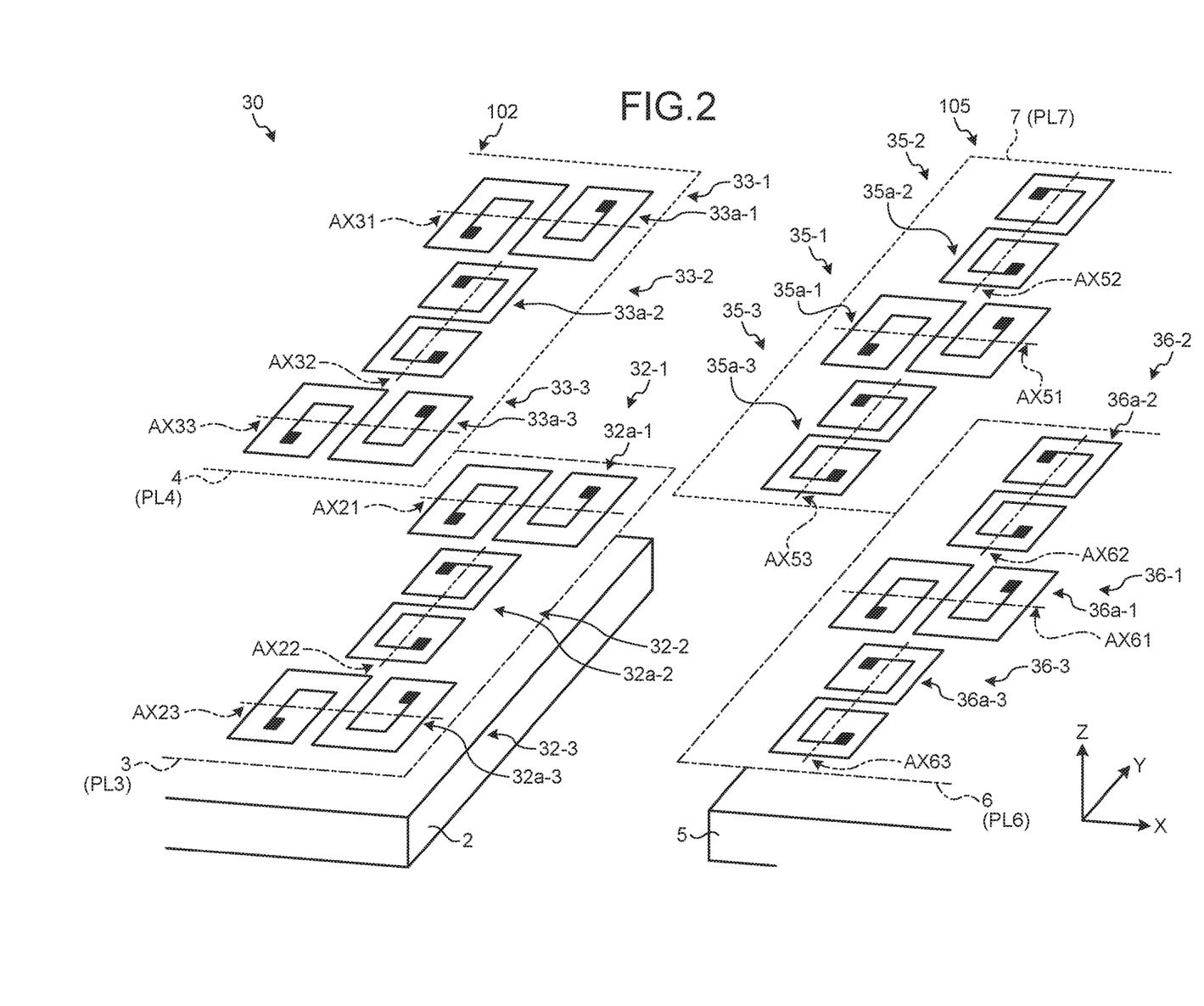
FIG. 2 is a diagram illustrating a mounting configuration of the magnetic coupler according to the embodiment.

The double insulation type configuration of each unit coupler in the magnetic coupler 30 may be mounted as illustrated in, for example, FIG. 2. FIG. 2 is a diagram illustrating a mounting configuration of the magnetic coupler 30. In FIG. 2, a direction substantially perpendicular to the surface of the substrate 2 is defined as a Z direction, and two directions orthogonal to each other in a plane perpendicular to the Z direction are defined as an X direction and a Y direction.

For example, the portions corresponding to the primary side (transmission side) of the plurality of unit couplers 31-1 to 31-3 may be mounted as follows. The differential amplifiers (refer to FIG. 1) of the transmission circuits 40-1 to 40-3 are mainly disposed on the substrate 2. The coil 32-1 electrically connected to the differential amplifier of the transmission circuit 40-1 may be configured as a pattern 32a-1 included in the wiring layer 3. The coil 32-2 electrically connected to the differential amplifier of the transmission circuit 40-2 may be configured as a pattern 32a-2 included in the wiring layer 3. The coil 32-3 electrically connected to the differential amplifier of the transmission circuit 40-3 may be configured as a pattern 32a-3 included in the wiring layer 3. The wiring layer 3 is a wiring layer disposed in the +Z direction of the substrate 2 and extends along the X and Y directions.

In the case of considering a virtual plane PL3 extending in the X and Y directions corresponding to the wiring layer 3, each of the pattern 32a-1, the pattern 32a-2, and the pattern 32a-3 is disposed along the plane PL3. Each of the pattern 32a-1, the pattern 32a-2, and the pattern 32a-3 may have a figure-8 shape and may have a meander shape.

Figure 3:
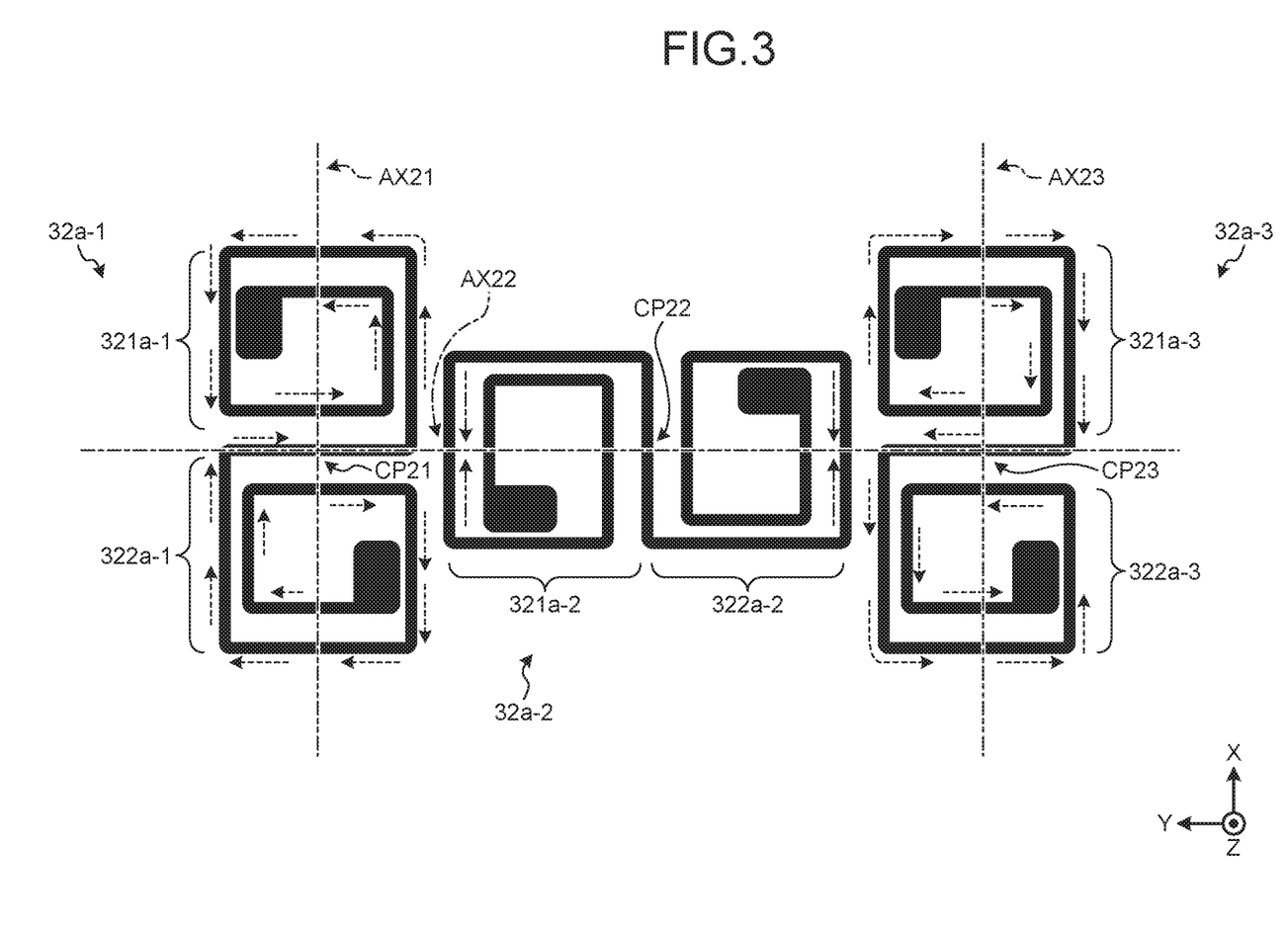
FIG. 3 is a diagram illustrating a planar configuration of a plurality of patterns according to the embodiment.

Here, the figure-8 shape means a shape having two winding portions which are wound in a reversed direction with each other and which are connected with each other. For example, the pattern 32a-1, as shown in FIG. 3, has a +X side winding portion 321a-1 and a −X side winding portion 322a-1. The +X side winding portion 321a-1 and the −X side winding portion 322a-1 are wound in a reversed direction with each other. One end of the winding portion 321a-1 is connected to one end of the winding portion 322a-1.

Further, the meander shape means a shape bending at a right angle to provide spiral forms as a whole. For example, when explaining along the broken line arrow in FIG. 3, the winding portion 322a-1 extends from substantially rectangular black portion, extends in +Y direction, extends in +X direction, extends in −Y direction, extends in −X direction, extends in +Y direction, extends in +X direction, extends in −Y direction. Similarly, when explaining along the broken line arrow in FIG. 3, the winding portion 321a-1 extends in −Y direction, extends in +X direction, extends in +Y direction, extends in −X direction, extends in −Y direction, extends in +X direction, extends in +Y direction.

In the pattern 32a-1, the size in the X direction is larger than the size in the Y direction. In the pattern 32a-2, the size in the Y direction is larger than the size in the X direction. In the pattern 32a-3, the size in the X direction is larger than the size in the Y direction. Each of the outer contour of the pattern 32a-1, the outer contour of the pattern 32a-2, and the outer contour of the pattern 32a-3 may be formed to have a substantially rectangular shape.

As illustrated in FIG. 3, in the case of considering a virtual axis penetrating the upper and lower annular patterns with respect to the center of the figure-8 shape in the pattern having a figure-8 shape, the pattern 32a-1 has an axis AX21 passing through the center CP21 of the figure-8 shape along the X direction. FIG. 3 is a diagram illustrating a planar configuration of the plurality of patterns 32a-1 to 32a-3. The pattern 32a-2 has an axis AX22 passing through the center CP22 of the figure-8 shape along the Y direction. The pattern 32a-3 has an axis AX23 passing through the center CP23 of the figure-8 shape along the X direction. The centers CP21 and CP23 of the figure-8 shape of the patterns 32a-1 and 32a-3 are disposed in the vicinity of the extension of the axis AX22 of the pattern 32a-2. The patterns 32a-1 and 32a-3 are disposed in a direction rotated by approximately 90° with respect to the pattern 32a-2 around the respective centers CP21 and CP23 of the figure-8 shapes of the patterns 32*a*-1 and 32*a*-3 in the vicinity of the extension of the axis AX22 of the pattern 32*a*-2.

In the pattern 32*a*-1, in the XY plane view, a +X side portion 321*a*-1 and a −X side portion 322*a-l* with respect to the center CP21 are reversely wound with each other. In the pattern 32*a*-2, in the XY plane view, the +Y side portion 321*a*-2 and the −Y side portion 322*a*-2 with respect to the center CP22 are reversely wound with each other. In the pattern 32*a*-3, in the XY plane view, the +X side portion 321*a*-3 and the −X side portion 322*a*-3 with respect to the center CP23 are reversely wound with each other.

For example, in a case where a current flows in the pattern 32*a*-1 in the direction indicated by the broken line arrow, an induced current may be generated in the portion 321*a*-2 in the direction indicated by the one-dot dashed line arrow due to the magnetic coupling between the portion 321*a*-1 of the pattern 32*a*-1 and the portion 321*a*-2 of the pattern 32*a*-2. In addition, an induced current may be generated in the portion 321*a*-2 in the direction indicated by the two-dot dashed line arrow due to the magnetic coupling between the portion 322*a*-1 of the pattern 32*a*-1 and the portion 321*a*-2 of the pattern 32*a*-2. In the portion 321*a*-2 of the pattern 32*a*-2, the induced current indicated by the one-dot dashed line arrow and the induced current indicated by the two-dot dashed line arrow may be canceled mutually because the induced currents are in the opposite directions. As a result, even if the arrangement interval between the pattern 32*a*-1 and the pattern 32*a*-2 is narrowed, it is possible to suppress the magnetic influence between the pattern 32*a*-1 and the pattern 32*a*-2, and thus, it is possible to mutually suppress the interference between the signal transmitted by the pattern 32*a*-1 and the signal transmitted by the pattern 32*a*-2.

In addition, in a case where a current flows in the pattern 32*a*-3 in the direction indicated by the broken line arrow, an induced current may be generated in the portion 322*a*-2 in the direction indicated by the one-dot dashed line arrow due to the magnetic coupling between the portion 321*a*-3 of the pattern 32*a*-3 and the portion 322*a*-2 of the pattern 32*a*-2. In addition, an induced current may be generated in the portion 322*a*-2 in the direction indicated by the two-dot dashed line arrow due to the magnetic coupling between the portion 322*a*-3 of the pattern 32*a*-3 and the portion 322*a*-2 of the pattern 32*a*-2. In the portion 322*a*-2 of the pattern 32*a*-2, the induced current indicated by the one-dot dashed line arrow and the induced current indicated by the two-dot dashed line arrow may be canceled mutually because the induced currents are in the opposite directions. As a result, even if the arrangement interval between the pattern 32*a*-2 and the pattern 32*a*-3 is narrowed, it is possible to suppress the magnetic influence between the pattern 32*a*-2 and the pattern 32*a*-3, and thus, it is possible to mutually suppress the interference between the signal transmitted by the pattern 32*a*-2 and the signal transmitted by the pattern 32*a*-3.

With this arrangement, even if the arrangement interval between the plurality of patterns 32*a*-1 to 32*a*-3 on the plane PL3 is narrowed, it is possible to suppress the magnetic influence between the plurality of patterns 32*a*-1 to 32*a*-3, and thus, it is possible to mutually suppress the interference of signals transmitted between the patterns 32*a*-1 to 32*a*-3.

Returning to FIG. 2, the coil 33-1 to be magnetically coupled with the coil 32-1 is disposed in the +Z direction of the coil 32-1 and faces the coil 32-1. The coil 33-1 may be configured as a pattern 33*a*-1 included in the wiring layer 4. The coil 33-2 to be magnetically coupled with the coil 32-2 is disposed in the +Z direction of the coil 32-2 and faces the coil 32-2. The coil 33-2 may be configured as a pattern 33*a*-2 included in the wiring layer 4. The coil 33-3 to be magnetically coupled with the coil 32-3 is disposed in the +Z direction of the coil 32-3 and faces the coil 32-3. The coil 33-3 may be configured as a pattern 33*a*-3 included in the wiring layer 4. The wiring layer 4 is a wiring layer disposed in the +Z direction of the wiring layer 3 and extends along the X and Y directions.

In the case of considering a virtual plane PL4 extending in the X and Y directions corresponding to the wiring layer 4, each of the pattern 33*a*-1, the pattern 33*a*-2, and the pattern 33*a*-3 is disposed along the plane PL4. Each of the pattern 33*a*-1, the pattern 33*a*-2, and the pattern 33*a*-3 may be configured as a pattern having a figure-8 shape.

In the pattern 33*a*-1, the size in the X direction is larger than the size in the Y direction. In the pattern 33*a*-2, the size in the Y direction is larger than the size in the X direction. In the pattern 33*a*-3, the size in the X direction is larger than the size in the Y direction. Each of the outer contour of the pattern 33*a*-1, the outer contour of the pattern 33*a*-2, and the outer contour of the pattern 33*a*-3 may be formed to have a substantially rectangular shape.

In the case of considering a virtual axis penetrating the upper and lower annular patterns with respect to the center of the figure-8 shape in the pattern having a figure-8 shape, the pattern 33*a*-1 has an axis AX31 passing through the center of the figure-8 shape along the X direction. The pattern 33*a*-2 has an axis AX32 passing through the center of the figure-8 shape along the Y direction. The pattern 33*a*-3 has an axis AX33 passing through the center of the figure-8 shape along the X direction. The center of the figure-8 shape in each of the patterns 33*a*-1 and 33*a*-3 is disposed in the vicinity of the extension of the axis AX32 of the pattern 33*a*-2. The patterns 33*a*-1 and 33*a*-3 are disposed in a direction rotated by substantially 90□ with respect to the pattern 33*a*-2 around the respective centers of the figure-8 shapes of the patterns 33*a*-1 and 33*a*-3 in the vicinity of the extension of the axis AX32 of the pattern 33*a*-2 (refer to FIG. 3).

With this arrangement, even if the arrangement interval between the plurality of patterns 33*a*-1 to 33*a*-3 on the plane PL4 is narrowed, it is possible to suppress the magnetic influence between the plurality of patterns 33*a*-1 to 33*a*-3, and thus, it is possible to mutually suppress the interference of the signals transmitted between the patterns 33*a*-1 to 33*a*-3.

In addition, the portions corresponding to the secondary side (reception side) of the plurality of unit couplers 31-1 to 31-3 may be mounted as follows. The differential amplifiers (refer to FIG. 1) of the reception circuits 50-1 to 50-3 are mainly disposed on the substrate 5. The coil 36-1 electrically connected to the differential amplifier of the reception circuit 50-1 may be configured as a pattern 36*a*-1 included in the wiring layer 6. The coil 36-2 electrically connected to the differential amplifier of the reception circuit 50-2 may be configured as the pattern 36*a*-2 included in the wiring layer 6. The coil 36-3 electrically connected to the differential amplifier of the reception circuit 50-3 may be configured as the pattern 36*a*-3 included in the wiring layer 6. The wiring layer 6 is a wiring layer disposed in the +Z direction of the substrate 5 and extends along the X and Y directions.

In the case of considering a virtual plane PL6 extending in the X and Y directions corresponding to the wiring layer 6, each of the pattern 36*a*-2, the pattern 36*a*-1, and the pattern 36*a*-3 is disposed along the plane PL6. Each of the pattern 36*a*-2, the pattern 36*a*-1, and the pattern 36*a*-3 may be configured as a pattern having a figure-8 shape.

In the pattern 36a-1, the size in the X direction is larger than the size in the Y direction. In the pattern 36a-2, the size in the Y direction is larger than the size in the X direction. In the pattern 36a-3, the size in the Y direction is larger than the size in the X direction. Each of the outer contour of the pattern 36a-1, the outer contour of the pattern 36a-2, and the outer contour of the pattern 36a-3 may be formed to have a substantially rectangular shape.

In the case of considering a virtual axis penetrating the upper and lower annular patterns with respect to the center of figure-8 shape in the pattern having a figure-8 shape, the pattern 36a-2 has an axis AX62 passing through the center of the figure-8 shape along the Y direction. The pattern 36a-1 has an axis AX61 passing through the center of the figure-8 shape along the X direction. The pattern 36a-3 has an axis AX63 passing through the center of the figure-8 shape along the Y direction. The center of the figure-8 shape in the pattern 36a-1 is disposed in the vicinity of the extension of the axis AX62 of the pattern 36a-2. The pattern 36a-1 is disposed in a direction rotated by substantially 90° with respect to the pattern 36a-2 around the center of the figure-8 shape in the pattern 36a-1 in the vicinity of the extension of the axis AX62 of the pattern 36a-2 (refer to FIG. 3).

With this arrangement, even if the arrangement interval between the plurality of patterns 36a-1 to 36a-3 on the plane PL6 is narrowed, it is possible to suppress the magnetic influence between the plurality of patterns 36a-1 to 36a-3, and thus, it is possible to mutually suppress the interference of signals transmitted between the patterns 36a-1 to 36a-3.

The coil 35-1 to be magnetically coupled with the coil 36-1 is disposed in the +Z direction of the coil 36-1 and faces the coil 36-1. The coil 35-1 may be configured as a pattern 35a-1 included in the wiring layer 7. The coil 35-2 to be magnetically coupled with the coil 36-2 is disposed in the +Z direction of the coil 36-2 and faces the coil 36-2. The coil 35-2 may be configured as a pattern 35a-2 included in the wiring layer 7. The coil 35-3 to be magnetically coupled with the coil 36-3 is disposed in the +Z direction of the coil 36-3 and faces the coil 36-3. The coil 35-3 may be configured as a pattern 35a-3 included in the wiring layer 7. The wiring layer 7 is a wiring layer disposed in the +Z direction of the wiring layer 6 and extends along the X and Y directions.

In the case of considering a virtual plane PL7 extending in the X and Y directions corresponding to the wiring layer 7, each of the pattern 35a-2, the pattern 35a-1, and the pattern 35a-3 is disposed along the plane PL7. Each of the pattern 35a-2, the pattern 35a-1, and the pattern 35a-3 may be configured as a pattern having a figure-8 shape.

In the pattern 35a-1, the size in the X direction is larger than the size in the Y direction. In the pattern 35a-2, the size in the Y direction is larger than the size in the X direction. In the pattern 35a-3, the size in the Y direction is larger than the size in the X direction. Each of the outer contour of the pattern 35a-1, the outer contour of the pattern 35a-2, and the outer contour of the pattern 35a-3 may be formed to have a substantially rectangular shape.

In the case of considering a virtual axis penetrating the upper and lower annular patterns with respect to the center of figure-8 shape in the pattern having a figure-8 shape, the pattern 35a-2 has an axis AX52 passing through the center of the figure-8 shape along the Y direction. The pattern 35a-1 has an axis AX51 passing through the center of the figure-8 shape along the X direction. The pattern 35a-3 has an axis AX53 passing through the center of the figure-8 shape along the Y direction. The center of the figure-8 shape in the pattern 35a-1 is disposed in the vicinity of the extension of the axis AX52 of the pattern 35a-2. The pattern 35a-1 is disposed in a direction rotated by substantially 90° with respect to the pattern 35a-2 around the center of the figure-8 shape in the pattern 35a-1 in the vicinity of the extension of the axis AX52 of the pattern 35a-2 (refer to FIG. 3).

With this arrangement, even if the arrangement interval between the patterns 35a-1 to 35a-3 on the plane PL7 is narrowed, it is possible to suppress the magnetic influence between the plurality of patterns 35a-1 to 35a-3, and thus, it is possible to mutually suppress the interference of the signals transmitted between the patterns 35a-1 to 35a-3.

In addition, a region including the substrate 2, the wiring layer 3, and the wiring layer 4 corresponds to the chip region 102, and a region including the substrate 5, the wiring layer 6, and the wiring layer 7 corresponds to the chip region 105.

Figure 4:
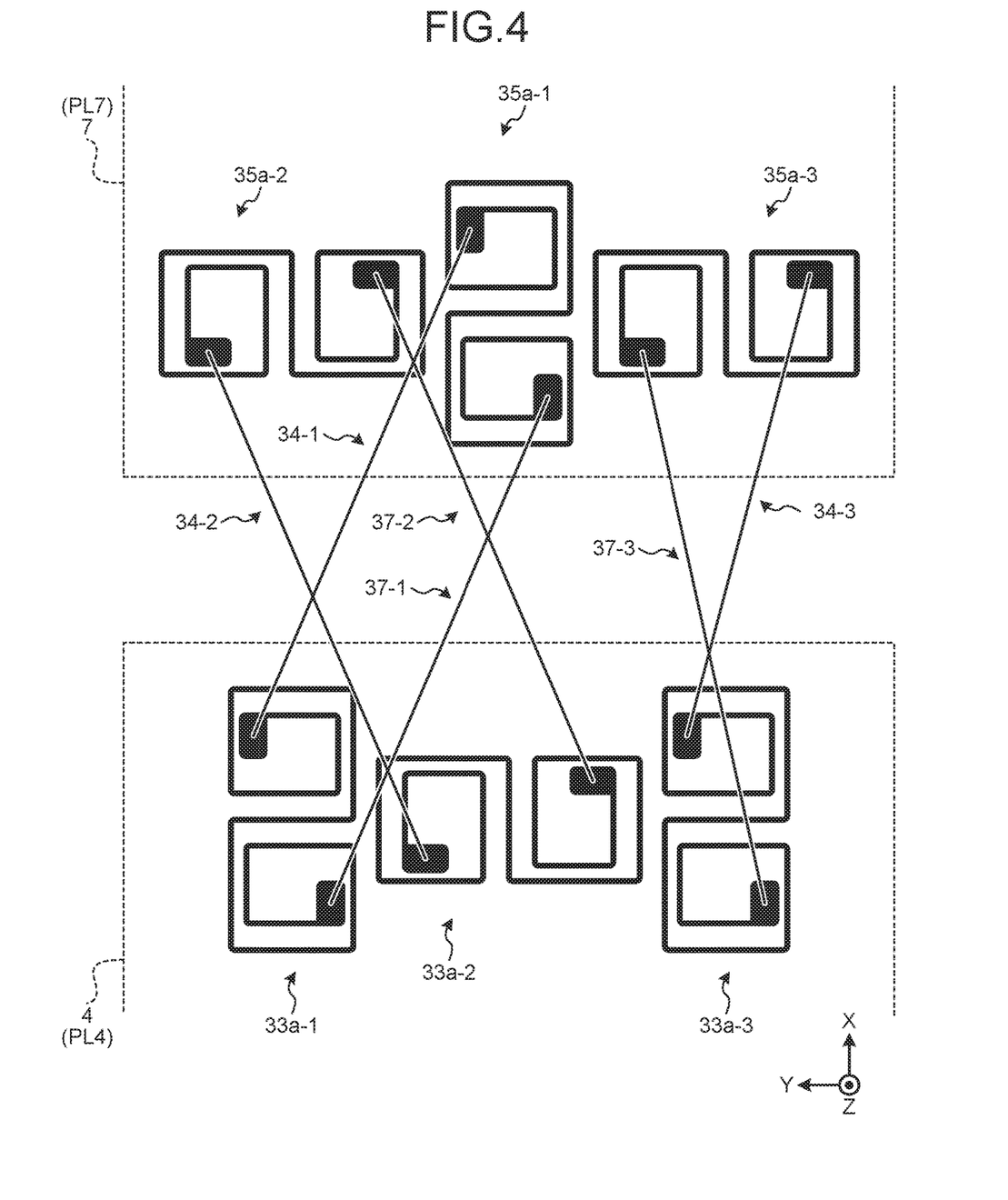
FIG. 4 is a diagram illustrating a mounting configuration of a bonding wire in the embodiment.

The bonding wires 34 and 37 in the magnetic coupler 30 may be mounted as illustrated in FIG. 4. FIG. 4 is a diagram illustrating a mounting configuration of the bonding wires 34 and 37.

The plurality of patterns 33a-1 to 33a-3 disposed along the plane PL4 and the plurality of patterns 35a-1 to 35a-3 disposed along the plane PL7 are electrically connected to each other through a plurality of bonding wires 34-1 to 34-3 and 37-1 to 37-3 which intersect with each other in the XY plane view. The plane PL4 is a plane corresponding to the wiring layer 4 disposed in the +Z direction of the substrate 2. The plane PL7 is a plane corresponding to the wiring layer 7 disposed in the +Z direction of the substrate 5. The plane PL7 is a plane spaced apart from the plane PL4 in the direction along the plane PL4.

For example, the bonding wire 34-1 intersects with the bonding wire 34-2 in the XY plane view. The bonding wire 34-1 connects one end of the pattern 33a-1 and one end of the pattern 35a-1. The bonding wire 34-2 connects one end of the pattern 33a-2 and one end of the pattern 35a-2. The bonding wire 34-1 intersects with the bonding wire 37-2 in the XY plane view. The bonding wire 37-2 connects the other end of the pattern 33a-2 and the other end of the pattern 35a-2.

The bonding wire 37-1 intersects with the bonding wire 34-2 in the XY plane view. The bonding wire 37-1 connects the other end of the pattern 33a-1 and the other end of the pattern 35a-1. The bonding wire 37-1 intersects with the bonding wire 37-2 in the XY plane view.

The bonding wire 34-3 intersects with the bonding wire 37-3 in the XY plane view. The bonding wire 34-3 connects one end of the pattern 33a-3 and the other end of the pattern 35a-3. The bonding wire 37-3 connects the other end of the pattern 33a-2 and one end of the pattern 35a-3.

The plurality of bonding wires 34-1 to 34-3 and 37-1 to 37-3 are connected so as to intersect with each other in the XY plane view, so that it is possible to reduce the magnetic coupling between the plurality of bonding wires 34-1 to 34-3 and 37-1 to 37-3.

As described above, in the embodiment, in the magnetic coupler 30, each pattern (each pattern) of the plurality of coils is formed to have a figure-8 shape, and adjacent patterns in a plane are disposed in direction of mutual rotation. As a result, it is possible to reduce the mounting area of the plurality of patterns, and it is possible to mutually suppress the interference between the plurality of signals transmitted by the plurality of patterns. That is, with respect to the magnetic coupler 30, the reduction of the mounting area and the appropriate transmission of the plurality of signals can be made compatible.

Figure 5:
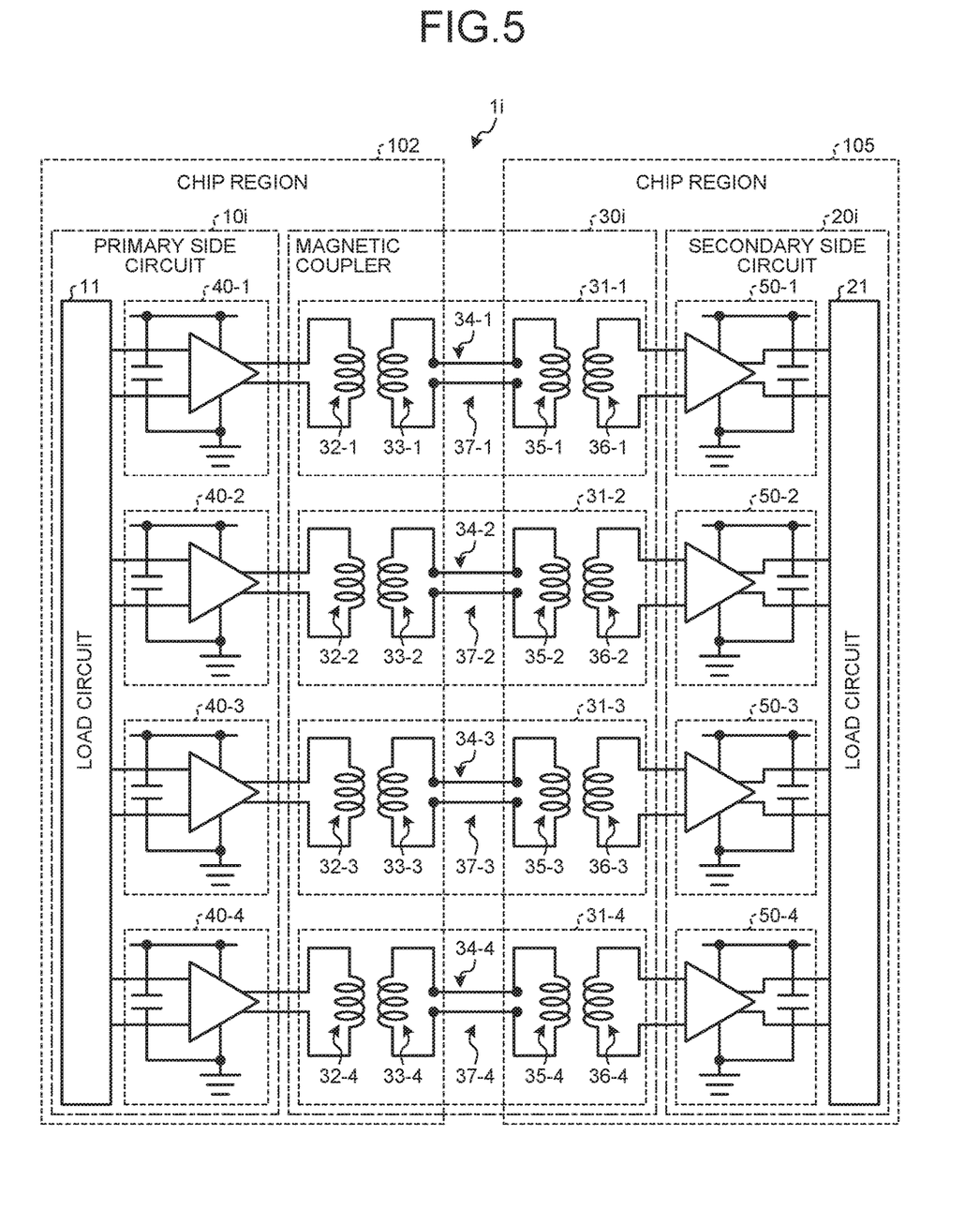
FIG. 5 is a diagram illustrating a circuit configuration of a communication system including a magnetic coupler according to a modified example of the embodiment.

In addition, the number of unit couplers included in the magnetic coupler is not limited to three illustrated in FIG. 1, or may be two or four or more. For example, in a case where the number of unit couplers included in the magnetic coupler is four, a communication system 1*i* including a magnetic coupler 30*i* may be configured as illustrated in FIG. 5. FIG. 5 is a diagram illustrating a configuration of the communication system 1*i* including the magnetic coupler 30*i* according to a modified example of the embodiment. The communication system 1*i* includes a primary side circuit 10*i*, a secondary side circuit 20*i*, and the magnetic coupler 30*i*. In FIG. 4, a configuration in which the magnetic coupler 30*i* converts four pairs of differential signals into magnetic field energy and re-converts the magnetic field energy into four pairs of differential signals is illustrated. The primary side circuit 10*i* includes a load circuit 11 and a plurality of transmission circuits 40-1 to 40-4. The secondary side circuit 20*i* includes a plurality of reception circuits 50-1 to 50-4 and a load circuit 21. The magnetic coupler 30*i* includes a plurality of unit couplers 31-1 to 31-4. The plurality of unit couplers 31-1 to 31-4 corresponds to the plurality of transmission circuits 40-1 to 40-4 and corresponds to the plurality of reception circuits 50-1 to 50-4.

Figure 6:
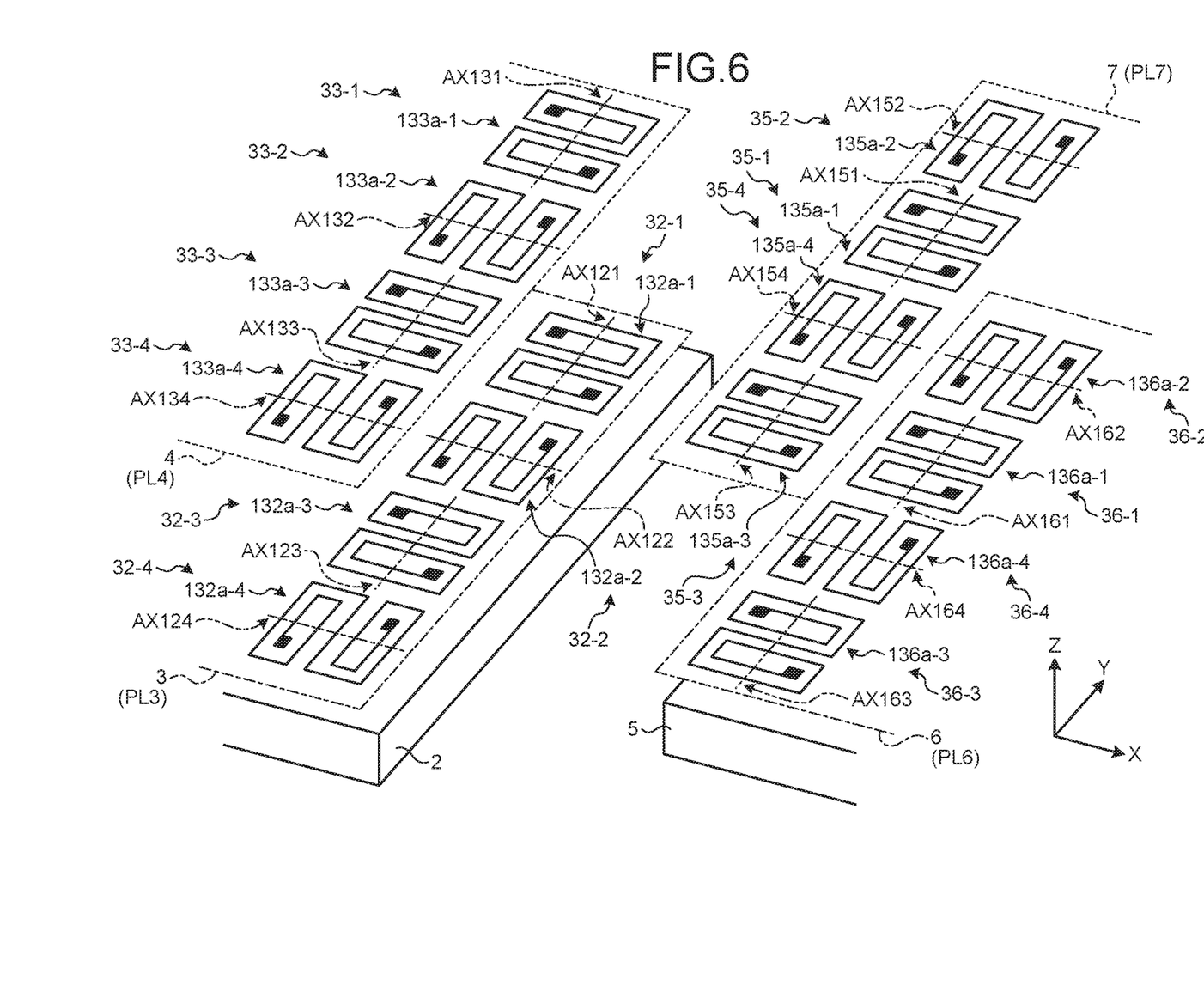
FIG. 6 is a diagram illustrating a mounting configuration of the magnetic coupler according to the modified example of the embodiment.

Alternatively, the size in the X direction and the size in the Y direction of each pattern in the magnetic coupler may be substantially equal to each other. The double insulation type configuration of each unit coupler in the magnetic coupler 30*i* illustrated in, for example, FIG. 5 may be mounted as illustrated in, for example, FIG. 6. FIG. 6 is a diagram illustrating a mounting configuration of the magnetic coupler 30*i* according to the modified example of the embodiment. In FIG. 6, a direction substantially perpendicular to the surface of the substrate 2 is defined as a Z direction, and two directions orthogonal to each other in a plane perpendicular to the Z direction are defined as an X direction and a Y direction.

In the case of considering a virtual plane PL3 extending in the X and Y directions corresponding to the wiring layer 3, each of the pattern 132*a*-1, the pattern 132*a*-2, the pattern 132*a*-3, and the pattern 132*a*-4 is disposed along the plane PL3. Each of the pattern 32*a*-1, the pattern 32*a*-2, the pattern 32*a*-3, and the pattern 32*a*-4 may be configured as a pattern having a figure-8 shape.

In the pattern 132*a*-1, the size in the X direction and the size in the Y direction are substantially equal to each other. In the pattern 132*a*-2, the size in the X direction and the size in the Y direction are substantially equal to each other. In the pattern 132*a*-3, the size in the X direction and the size in the Y direction are substantially equal to each other. In the pattern 132*a*-4, the size in the X direction and the size in the Y direction are substantially equal to each other. Each of the outer contour of the pattern 132*a*-1, the outer contour of the pattern 32*a*-2, the outer contour of the pattern 132*a*-3, and the outer contour of the pattern 132*a*-4 may be formed to have a substantially square shape.

Figure 7:
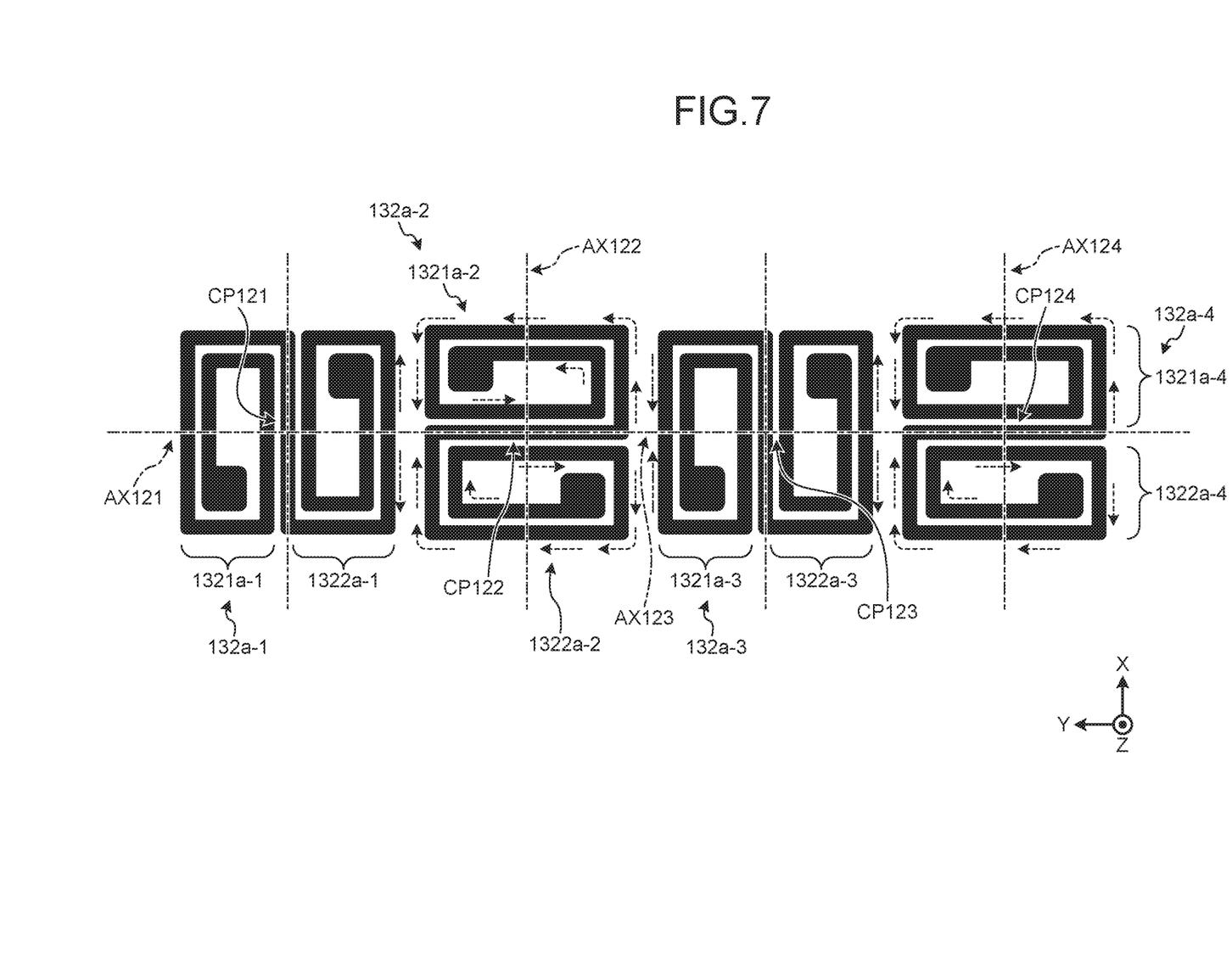
FIG. 7 is a diagram illustrating a planar configuration of the magnetic coupler according to the modified example of the embodiment.

As illustrated in FIG. 7, in the case of considering a virtual axis penetrating the upper and lower annular patterns with respect to the center of the figure-8 shape in the pattern having a figure-8 shape, the pattern 132*a*-1 has an axis AX121 passing through the center CP121 of the figure-8 shape along the Y direction. FIG. 7 is a diagram illustrating a planar configuration of the plurality of patterns 132*a*-1 to 132*a*-4. The pattern 132*a*-2 has an axis AX122 passing through the center CP122 of the figure-8 shape along the X direction. The pattern 132*a*-3 has an axis AX123 passing through the center CP123 of the figure-8 shape along the Y direction. The pattern 132*a*-4 has an axis AX124 passing through the center CP124 of the figure-8 shape along the X direction. The centers CP122 and CP124 of the figure-8 shapes in the patterns 132*a*-2 and 132*a*-2 are disposed in the vicinity of the extension of the axis AX121 of the pattern 132*a*-1. The patterns 132*a*-2 and 132*a*-4 are disposed in a direction rotated by substantially 90□ with respect to the pattern 132*a*-1 around the respective centers CP122 and CP124 of the figure-8 shapes in the patterns 132*a*-2 and 132*a*-4 in the vicinity of the extension of the axis AX121 of the pattern 132*a*-1.

In the pattern 132*a*-1, in the XY plane view, the +Y side portion 1321*a*-1 and the −Y side portion 1322*a*-1 with respect to the center CP121 are reversely wound with each other. In the pattern 132*a*-2, in the XY plane view, the +X side portion 1321*a*-2 and the −X side portion 1322*a*-2 with respect to the center CP122 are reversely wound with each other. In the pattern 132*a*-3, in the XY plane view, the +Y side portion 1321*a*-3 and the −Y side portion 1322*a*-3 with respect to the center CP123 are reversely wound with each other. In the pattern 132*a*-4, in the XY plane view, the +X side portion 1321*a*-4 and the −X side portion 1322*a*-4 with respect to the center CP124 are reversely wound with each other.

For example, in a case where a current flows in the pattern 132*a*-2 in the direction indicated by the broken line arrow, an induced current may be generated in the portion 1322*a*-1 in the direction indicated by the one-dot dashed line arrow due to the magnetic coupling between the portion 1321*a*-2 of the pattern 132*a*-2 and the portion 1322*a*-1 of the pattern 132*a*-1. In addition, an induced current may be generated in the portion 1322*a*-2 in the direction indicated by the two-dot dashed line arrow due to the magnetic coupling between the portion 1322*a*-2 of the pattern 132*a*-2 and the portion 1322*a*-1 of the pattern 132*a*-1. In the portion 1322*a*-1 of the pattern 132*a*-1, the induced current indicated by the one-dot dashed line arrow and the induced current indicated by the two-dot dashed line arrow may be canceled mutually because the induced currents are in the opposite directions. As a result, even if the arrangement interval between the pattern 132*a*-1 and the pattern 132*a*-2 is narrowed, it is possible to suppress the magnetic influence between the pattern 132*a*-1 and the pattern 132*a*-2, and thus, it is possible to mutually suppress the interference between the signal transmitted by the pattern 132*a*-1 and the signal transmitted by the pattern 132*a*-2.

In addition, in a case where a current flows in the pattern 132*a*-4 in the direction indicated by the broken line arrow, an induced current may be generated in the portion 1322*a*-3 in the direction indicated by the one-dot dashed line arrow due to the magnetic coupling between the portion 1321*a*-4 of the pattern 132*a*-4 and the portion 1322*a*-3 of the pattern 132*a*-3. In addition, an induced current may be generated in the portion 1322*a*-3 in the direction indicated by the two-dot dashed line arrow due to the magnetic coupling between the portion 1322*a*-4 of the pattern 132*a*-4 and the portion 1322*a*-3 of the pattern 132*a*-3. In the portion 1322*a*-3 of the pattern 132*a*-3, the induced current indicated by the one-dot dashed line arrow and the induced current indicated by the two-dot dashed line arrow may be canceled mutually because the induced currents are in the opposite directions. As a result, even if the arrangement interval between the pattern 132*a*-3 and the pattern 132*a*-4 is narrowed, it is possible to suppress the magnetic influence between the pattern 132*a*-3 and the pattern 132*a*-4, and thus, it is possible to mutually suppress the interference between the signal transmitted by the pattern 132*a*-3 and the signal transmitted by the pattern 132*a*-4.

With this arrangement, even if the arrangement interval between the plurality of patterns 132a-1 to 132a-4 on the plane PL3 is narrowed, it is possible to suppress the magnetic influence between the plurality of patterns 132a-1 to 132a-4, and thus, it is possible to mutually suppress the interference of the signals transmitted between the plurality of patterns 132a-1 to 132a-4. In addition, since the outer contour of each pattern 132a is formed to have a substantially square shape, the arrangement width in the X direction can be made uniform in a case where this arrangement is performed, and thus, it is possible to easily improve the mounting density.

Returning to FIG. 6, in the case of considering a virtual plane PL4 extending in the X and Y directions corresponding to the wiring layer 4, each of the pattern 133a-1, the pattern 133a-2, the pattern 133a-3, and the pattern 133a-4 is disposed along the plane PL4. Each of the pattern 132a-1, the pattern 132a-2, the pattern 132a-3, and the pattern 132a-4 may be configured as a pattern having a figure-8 shape.

In the pattern 133a-1, the size in the X direction and the size in the Y direction are substantially equal to each other. In the pattern 133a-2, the size in the X direction and the size in the Y direction are substantially equal to each other. In the pattern 133a-3, the size in the X direction and the size in the Y direction are substantially equal to each other. In the pattern 133a-4, the size in the X direction and the size in the Y direction are substantially equal to each other. Each of the outer contour of the pattern 133a-1, the outer contour of the pattern 133a-2, the outer contour of the pattern 133a-3, and the outer contour of the pattern 133a-4 may be formed to have a substantially square shape.

In the case of considering a virtual axis penetrating the upper and lower annular patterns with respect to the center of figure-8 shape in the pattern having a figure-8 shape, the pattern 133a-1 has an axis AX131 passing through the center of the figure-8 shape along the Y direction. FIG. 7 is a diagram illustrating a planar configuration of the plurality of patterns 133a-1 to 133a-4. The pattern 133a-2 has an axis AX132 passing through the center of the figure-8 shape along the X direction. The pattern 133a-3 has an axis AX133 passing through the center of the figure-8 shape along the Y direction. The pattern 133a-4 has an axis AX134 passing through the center of the figure-8 shape along the X direction. The center of the figure-8 shape in each of the patterns 133a-2 and 133a-2 is disposed in the vicinity of the extension of the axis AX131 of the pattern 133a-1. The patterns 133a-2 and 133a-4 are disposed in a direction rotated by substantially 90□ with respect to the pattern 133a-1 around the respective centers of the figure-8 shapes in the patterns 133a-2 and 133a-4 in the vicinity of the extension of the axis AX131 of the pattern 133a-1.

With this arrangement, even if the arrangement interval between the plurality of patterns 133a-1 to 133a-4 on the plane PL4 is narrowed, it is possible to suppress the magnetic influence between the plurality of patterns 133a-1 to 133a-4, and thus, it is possible to mutually suppress the interference of the signals transmitted between the plurality of patterns 133a-1 to 133a-4. In addition, since the outer contour of each pattern 133a is formed to have a substantially square shape, the arrangement width in the X direction can be made uniform in a case where this arrangement is performed, and thus, it is possible to easily improve the mounting density.

In the case of considering a virtual plane PL6 extending in the X and Y directions corresponding to the wiring layer 6, each of the pattern 136a-2, the pattern 136a-1, the pattern 136a-3, and the pattern 136a-4 is disposed along the plane PL6. Each of the pattern 136a-2, the pattern 136a-1, the pattern 136a-3, and the pattern 136a-4 may be configured as a pattern having a figure-8 shape.

In the pattern 136a-1, the size in the X direction and the size in the Y direction are substantially equal to each other. In the pattern 136a-2, the size in the X direction and the size in the Y direction are substantially equal to each other. In the pattern 136a-3, the size in the X direction and the size in the Y direction are substantially equal to each other. In the pattern 136a-4, the size in the X direction and the size in the Y direction are substantially equal to each other. Each of the outer contour of the pattern 136a-1, the outer contour of the pattern 136a-2, the outer contour of the pattern 136a-3, and the outer contour of the pattern 136a-4 may be formed to have a substantially square shape.

In the case of considering a virtual axis penetrating the upper and lower annular patterns with respect to the center of figure-8 shape in the pattern having a figure-8 shape, the pattern 136a-2 has an axis AX162 passing through the center of the figure-8 shape along the X direction. The pattern 136a-1 has an axis AX161 passing through the center of the figure-8 shape along the Y direction. The pattern 136a-4 has an axis AX164 passing through the center of the figure-8 shape along the X direction. The pattern 136a-3 has an axis AX163 passing through the center of the figure-8 shape along the Y direction. The center of the figure-8 shape in each of the patterns 136a-2 and 136a-4 is disposed in the vicinity of the extension of the axis AX161 of the pattern 136a-1. The patterns 136a-2 and 136a-4 are disposed in a direction rotated by substantially 90° with respect to the pattern 136a-1 around the center of the figure-8 shape in the pattern 136a-1 in the vicinity of the extension of the axis AX161 of the pattern 136a-1 (refer to FIG. 7).

With this arrangement, even if the arrangement interval between the plurality of patterns 136a-1 to 136a-4 on the plane PL6 is narrowed, it is possible to suppress the magnetic influence between the plurality of patterns 136a-1 to 136a-4, and thus, it is possible to mutually suppress the interference of the signals transmitted between the plurality of patterns 136a-1 to 136a-4. In addition, since the outer contour of each pattern 136a is formed to have a substantially square shape, the arrangement width in the X direction can be made uniform in a case where this arrangement is performed, and thus, it is possible to easily improve the mounting density.

In the case of considering a virtual plane PL7 extending in the X and Y directions corresponding to the wiring layer 7, each of the pattern 135a-2, the pattern 135a-1, the pattern 135a-3, and the pattern 135a-4 is disposed along the plane PL6. Each of the pattern 135a-2, the pattern 135a-1, the pattern 135a-3, and the pattern 135a-4 may be configured as a pattern having a figure-8 shape.

In the pattern 135a-1, the size in the X direction and the size in the Y direction are substantially equal to each other. In the pattern 135a-2, the size in the X direction and the size in the Y direction are substantially equal to each other. In the pattern 135a-3, the size in the X direction and the size in the Y direction are substantially equal to each other. In the pattern 135a-4, the size in the X direction and the size in the Y direction are substantially equal to each other. Each of the outer contour of the pattern 135a-1, the outer contour of the pattern 135a-2, the outer contour of the pattern 135a-3, and the outer contour of the pattern 135a-4 may be formed to have a substantially square shape.

In the case of considering a virtual axis penetrating the upper and lower annular patterns with respect to the center of figure-8 shape in the pattern having a figure-8 shape, the pattern 135a-2 has an axis AX152 passing through the center of the figure-8 shape along the X direction. The pattern 135a-1 has an axis AX151 passing through the center of the figure-8 shape along the Y direction. The pattern 135a-4 has an axis AX154 passing through the center of the figure-8 shape along the X direction. The pattern 135a-3 has an axis AX153 passing through the center of the figure-8 shape along the Y direction. The center of the figure-8 shape in each of the patterns 135a-2 and 135a-4 is disposed in the vicinity of the extension of the axis AX151 of the pattern 135a-1. The patterns 135a-2 and 135a-4 are disposed in a direction rotated by substantially 90□ with respect to the pattern 135a-1 around the center of the figure-8 shape in the pattern 135a-1 in the vicinity of the extension of the axis AX151 of the pattern 135a-1 (refer to FIG. 7).

With this arrangement, even if the arrangement interval between the plurality of patterns 135a-1 to 135a-4 on the plane PL7 is narrowed, it is possible to suppress the magnetic influence between the plurality of patterns 135a-1 to 135a-4, and thus, it is possible to mutually suppress the interference of the signals transmitted between the plurality of patterns 135a-1 to 135a-4. In addition, since the outer contour of each pattern 135a is formed to have a substantially square shape, the arrangement width in the X direction can be made uniform in a case where this arrangement is performed, and thus, it is possible to easily improve the mounting density.

In this manner, the size in the X direction and the size in the Y direction for each pattern in the magnetic coupler are set to be substantially equal to each other, so that it is possible to further improve the mounting density of the magnetic coupler.

Alternatively, the bonding wires 34 and 37 in the magnetic coupler 30i may be mounted as illustrated in FIG. 8. FIG. 8 is a diagram illustrating a mounting configuration of the bonding wires 34 and 37.

The plurality of patterns 133a-1 to 133a-4 disposed along the plane PL4 and the plurality of patterns 135a-1 to 135a-4 disposed along the plane PL7 are electrically connected to each other through a plurality of bonding wires 34-1 to 34-4 and 37-1 to 37-4 which intersect with each other in the XY plane view. The plane PL4 is a plane corresponding to the wiring layer 4 disposed in the +Z direction of the substrate 2. The plane PL7 is a plane corresponding to the wiring layer 7 disposed in the +Z direction of the substrate 5. The plane PL7 is a plane spaced apart from the plane PL4 in the direction along the plane PL4.

For example, the bonding wire 34-1 intersects with the bonding wire 34-2 in the XY plane view. The bonding wire 34-1 connects one end of the pattern 133a-1 and one end of the pattern 135a-1. The bonding wire 34-2 connects one end of the pattern 133a-2 and one end of the pattern 135a-2. The bonding wire 34-1 intersects with the bonding wire 37-2 in the XY plane view. The bonding wire 37-2 connects the other end of the pattern 133a-2 and the other end of the pattern 135a-2.

The bonding wire 37-1 intersects with the bonding wire 34-2 in the XY plane view. The bonding wire 37-1 connects the other end of the pattern 133a-1 and the other end of the pattern 135a-1. The bonding wire 37-1 intersects with the bonding wire 37-2 in the XY plane view.

The bonding wire 34-3 intersects with the bonding wire 34-4 in the XY plane view. The bonding wire 34-3 connects one end of the pattern 133a-3 and one end of the pattern 135a-3. The bonding wire 34-4 connects one end of the pattern 133a-4 and one end of the pattern 135a-4. The bonding wire 34-3 intersects with the bonding wire 37-4 in the XY plane view. The bonding wire 37-4 connects the other end of the pattern 133a-4 and the other end of the pattern 135a-4.

The bonding wire 37-3 intersects with the bonding wire 34-4 in the XY plane view. The bonding wire 37-3 connects the other end of the pattern 133a-3 and the other end of the pattern 135a-3. The bonding wire 37-3 intersects with the bonding wire 37-4 in the XY plane view.

The plurality of bonding wires 34-1 to 34-4 and 37-1 to 37-4 are connected so as to intersect with each other in the XY plane view, so that it is possible to reduce the magnetic coupling between the plurality of bonding wires 34-1 to 34-4 and 37-1 to 37-4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic coupler, comprising:
a plurality of coils,
wherein the plurality of coils comprises:
a first pattern disposed along a first plane, the first pattern including a first winding portion and a second winding portion, the second winding portion being arranged in a first direction to the first winding portion, the second winding portion being wound in a reversed direction with the first winding portion; and
a second pattern disposed outside the first pattern and adjacent to the first pattern in the first plane, the second pattern being arranged at a position corresponding to a boundary between the first winding pattern and the second winding pattern, the second pattern including a third winding portion and a fourth winding portion, the fourth winding portion being arranged in a second direction to the third winding portion, the second direction being a different direction from the first direction, the fourth winding portion being wound in a reversed direction with the third winding portion;
wherein the first pattern and the second pattern are rotationally symmetrical to each other.

2. The magnetic coupler according to claim 1, wherein a size of the first pattern along the first direction and a size of the second pattern along the second direction are substantially equal to each other.

3. The magnetic coupler according to claim 1, wherein the first pattern and the second pattern are not magnetically coupled to each other.

4. The magnetic coupler according to claim 3, wherein the first pattern and the second pattern are patterns that reduce induction current with each other.

5. The magnetic coupler according to claim 4, wherein each of the first pattern and the second pattern has a shape like a figure-8.

6. The magnetic coupler according to claim 4, wherein each of the first pattern and the second pattern has a shape like a meander.

7. The magnetic coupler according to claim 1,
wherein the first pattern has a size in the first direction larger than a size in the second direction, and wherein the second pattern has a size in the first direction smaller than a size in the second direction.

8. The magnetic coupler according to claim 1,
wherein the plurality of coils further comprises a third pattern similar to the first pattern, the third pattern being disposed outside the second pattern and adjacent to the second pattern in the first plane, the third pattern being arranged at the position corresponding to the boundary between the first winding pattern and the second winding pattern, the third pattern including a fifth winding portion and a sixth winding portion, the sixth winding portion being arranged in the first direction to the fifth winding portion, the sixth winding portion being wound in a reversed direction with the fifth winding portion, and
wherein the second pattern and the third pattern are rotationally symmetrical to each other.

9. The magnetic coupler according to claim 8, wherein a size of the first pattern along the first direction and a size of the second pattern along the second direction are substantially equal to each other.

10. The magnetic coupler according to claim 9, wherein the second pattern and the third pattern are patterns that reduce induction current with each other.

11. The magnetic coupler according to claim 10, wherein each of the second pattern and the third pattern has a shape like a figure-8.

12. The magnetic coupler according to claim 10, wherein each of the second pattern and the third pattern has a shape like a meander.

13. The magnetic coupler according to claim 8,
wherein the first pattern has a size in the first direction larger than a size in the second direction,
wherein the second pattern has a size in the first direction smaller than a size in the second direction, and
wherein the third pattern has a size in the first direction larger than a size in the second direction.

14. The magnetic coupler according to claim 1, wherein the plurality of coils further comprises:
a fourth pattern disposed along a second plane spaced apart from the first plane in a direction facing the first plane, the fourth pattern facing the first pattern, the fourth pattern including a seventh winding portion and a eighth winding portion, the eight winding portion being arranged in the first direction to the seventh winding portion, the second winding portion being wound in a reversed direction with the seventh winding portion; and
a fifth pattern disposed outside the fourth pattern and adjacent to the fourth pattern in the second plane, the fifth pattern facing the second pattern, the fourth pattern including a ninth winding portion and a tenth winding portion, the tenth winding portion being arranged in the second direction to the ninth winding portion, the tenth winding portion being wound in a reversed direction with the ninth winding portion;
wherein the fourth pattern and the fifth pattern are rotationally symmetrical to each other.

15. The magnetic coupler according to claim 14, wherein the plurality of coils further comprises:
a sixth pattern disposed along a third plane spaced apart from the first plane in a direction along the first plane, the fourth pattern being not magnetically coupled to the fourth pattern, the sixth pattern including a eleventh winding portion and a twelfth winding portion, the twelfth winding portion being arranged in the second direction to the eleventh winding portion, the twelfth winding portion being wound in a reversed direction with the eleventh winding portion; and
a seventh pattern disposed outside the first pattern and adjacent to the sixth pattern in the third plane, the seventh pattern including a thirteenth winding portion and a fourteenth winding portion, the fourteenth winding portion being arranged in the first direction to the thirteenth winding portion, the fourteenth winding portion being wound in a reversed direction with the thirteenth winding portion;
wherein the sixth pattern and the seventh pattern are rotationally symmetrical to each other.

16. The magnetic coupler according to claim 15, further comprising:
a first wire electrically connecting the first pattern and the seventh pattern; and
a second wire intersecting with the first wire when viewed from a direction perpendicular to the first plane and electrically connecting the second pattern and the sixth pattern.

17. A communication system, comprising:
a transmission circuit;
a reception circuit; and
the magnetic coupler according to claim 1 disposed between the transmission circuit and the reception circuit.

18. The magnetic coupler according to claim 3, wherein an outer contour of the first pattern and an outer contour of the second pattern have substantially square shapes corresponding to each other.

19. The magnetic coupler according to claim 18,
wherein the plurality of coils further comprises a third pattern similar to the first pattern, the third pattern being disposed adjacent to the second pattern along the first plane, the third pattern being arranged at the position corresponding to the boundary between the first winding pattern and the second winding pattern, the third pattern including a fifth winding portion and a sixth winding portion, the sixth winding portion being arranged in the first direction to the fifth winding portion, the sixth winding portion being wound in a reversed direction with the fifth winding portion.

20. A communication system, comprising:
a transmission circuit;
a reception circuit; and
the magnetic coupler according to claim 18 disposed between the transmission circuit and the reception circuit.

* * * * *